Patented Nov. 29, 1938

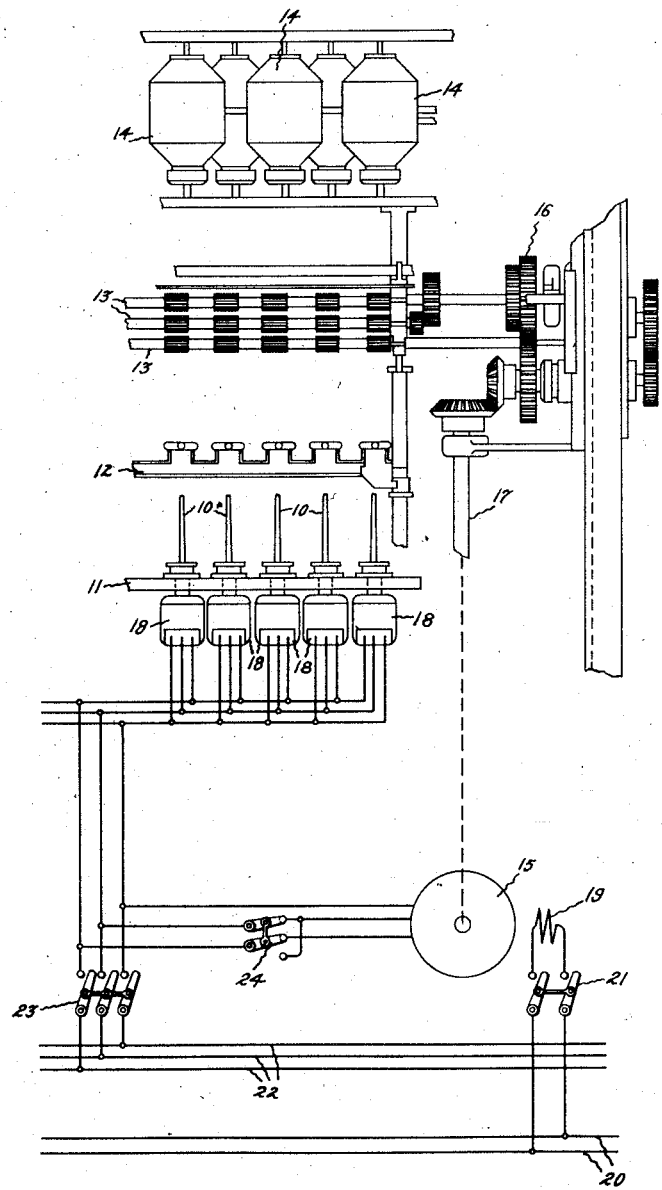

2,138,658

UNITED STATES PATENT OFFICE 2,138,658

DRIVING MEANS FOR SPINNING MACHINES

Tatsuo Hongo, Yokohama, Japan, assignor to General Electric Company, a corporation of New York Application August 25, 1937, Serial No. 160,874
In Japan November 16, 1936

6 Claims. (Cl. 118—43)

My invention relates to driving means for spinning machines and the like, more particularly to driving means in which each spindle is driven by a separate motor, and has for its object a simple and reliable system for stopping the spindle motors in synchronism with each other and with driving means for the other parts of the spinning machine.

In accordance with my invention, I provide separate high speed motors of the induction type for driving the spindles together with a synchronous motor for driving the other parts of the spinning machine together with switching means whereby when the machine is to be stopped the spindle motors and the synchronous motor are disconnected from the alternating current supply source but remain electrically connected to each other, the field excitation of the synchronous motor also being maintained. I also provide a phase reversing switch in the connection between the spindle motors and the synchronous motor, whereby the motors are electrically braked and stopped quickly in synchronism with each other, i. e., in a desired time relation or at the same proportionate rate.

For more complete understanding of my invention reference should be made to the accompanying drawing, the single figure of which is a diagrammatic representation of the electric spinning machine and driving system embodying my invention.

Referring to the drawing, I have shown my invention in one form as applied to a typical spinning machine comprising a plurality of spindles 10, a ring rail 11, a guide rail 12 and the rollers 13 for stretching and feeding the thread or untwisted yarn which is received from the bobbins 14. The rollers 13 are driven by a synchronous motor 15 through a change-speed gearing 16 to which the shaft 17 of the motor is connected. Also the ring rail 11 is connected to the motor shaft 17 by means of a suitable poker-arm (not shown) so as to be given a suitable upward and downward motion. The spindles 10 are driven by separate high-speed asynchronous induction motors 18 having a very small power input as compared with the motor 15.

The field winding 19 of the synchronous motor may be connected to a direct current source of supply 20 by means of a switch 21 while the spindle motors 18 and the armature of the synchronous motor 15 may be connected in parallel with each other to a suitable three-phase source of supply 22 by means of a switch 23.

In the stopping of the machine the switch 23 is opened to disconnect the motors from the alternating current supply source 22, the switch 21 remaining closed so that the field of the synchronous motor is maintained. The motors thus remain connected to each other and are thereby electrically tied together for deceleration in synchronism. The synchronous motor may at this time operate as a generator or may be driven as a motor from the spindle motors acting as generators in the event that the spindle motors decelerate at a slower rate than the synchronous motor. Thus any difference in the frequencies of the motors produces a synchronous torque and the motors are decelerated and stopped in synchronism with each other.

In the system thus far described, because of the fact that the synchronous torque produced in each spindle motor 18 becomes weaker upon decrease in the speed and becomes especially weak when the motors are nearly at rest, this synchronous torque in some cases has been found not sufficient at the lower speeds to stop with precision all the motors at the same time.

I therefore provide a phase-reversing switch 24 in the three-phase connections between the synchronous motor 15 and the spindle motors, this switch operating to reverse the electrical connections to two of the terminals of the motor 15.

In stopping, this switch 24 is operated immediately after the switch 23 has been opened as above described, or after a predetermined time interval after the switch 23 is opened, and thereby the phase relation of the motor 15 is reversed with respect to the phase relation of the spindle motors. In this manner an electric brake is applied to the motors by reason of their interconnection whereby the motors are stopped more quickly, and more precisely in synchronism with each other, as compared with stopping without the reversed phase. Because of the fact that the motors are rotating by reason of their own inertia and the inertia of the driven parts of the spinning machine there is no danger of reverse rotation on account of such braking.

What I claim as new and desire to secure by Letters Patent of the United States is:

1. The combination with a spinning machine or the like provided with thread feeding means and spindles, of separate polyphase motors for driving said spindles and said feeding means, one of said motors being a synchronous motor provided with a direct-current field winding and the remainder of said motors being asynchronous motors, connections for energizing said spindle motors and said synchonous motor in parallel with each other from a source of alternating current, connections for energizing said field winding from a source of direct current, and means for disconnecting said motors from the alternating-current supply source while maintaining said parallel connections between said motors whereby said motors are decelerated in synchronism with each other.

2. The combination with a spinning machine or the like provided with thread feeding means and spindles, of separate asynchronous induction motors for driving said spindles, a synchronous motor connected to drive said feeding means and provided with a direct-current field winding, connections for energizing said spindle motors and said synchronous motor in parallel with each other from a source of alternating current, connections for energizing said field winding from a source of direct current, and means for disconnecting said motors from the alternating-current supply source while maintaining said parallel connections between said motors whereby said motors are decelerated in synchronism with each other.

3. The combination with a spinning machine or the like provided with thread feeding means and spindles, of separate polyphase motors for driving said spindles and said feeding means, one of said motors being a synchronous motor provided with a direct-current field winding and the remainder of said motors being asynchronous motors, connections for energizing said spindle motors and said synchronous motor in parallel with each other from a source of alternating current, connections for energizing said field winding from a source of direct current, means for disconnecting said motors from the alternating-current supply source while maintaining said parallel connections between said motors and means for reversing the connections to one of said motors whereby said motors are decelerated in synchronism with each other.

4. The combination with a spinning machine or the like provided with thread feeding means and spindles, comprising separate induction motors for driving said spindles, a synchronous motor connected to drive said feeding means and provided with a direct-current field winding, connections for energizing said spindle motors and said synchronous motor in parallel with each other from a source of alternating current, connections for energizing said field winding from a source of direct current, means for disconnecting said motors from the alternating-current supply source while maintaining said parallel connections between said motors and means for reversing the connections to said synchronous motor whereby said motors are decelerated in synchronism with each other.

5. In combination a plurality of asynchronous polyphase induction driving motors, a synchronous motor provided with a direct current field winding, said synchronous motor being relatively large as compared with said asynchronous motors, connections for energizing said asynchronous motors and said synchronous motor in parallel with each other from a source of alternating current, connections for energizing said field winding from a source of direct current and means for disconnecting said motors from the alternating current supply source while maintaining said parallel connections between said motors whereupon said motors are decelerated in a predetermined relation with each other.

6. In combination a plurality of asynchronous polyphase induction driving motors, a synchronous motor provided with a direct current field winding, said synchronous motor being relatively large as compared with said asynchronous motors, connections for energizing said asynchronous motors and said synchronous motor in parallel with each other from a source of alternating current, connections for energizing said field winding from a source of direct current, means for disconnecting said motors from the alternating current supply source while maintaining said parallel connections between said motors and means for reversing the connections to said synchronous motor whereupon said motors are decelerated in a predetermined relation with each other.

TATSUO HONGO.